L. A. CARTER.
TAIL STOCK FOR LATHES.
APPLICATION FILED APR. 30, 1917.

1,258,870.

Patented Mar. 12, 1918.

Witnesses:
Edgar F. Farmer
A. M. Holcombe

Inventor:
Lionel A. Carter
by Carr & Carr
his Attys.

UNITED STATES PATENT OFFICE.

LIONEL A. CARTER, OF ST. LOUIS, MISSOURI.

TAIL-STOCK FOR LATHES.

1,258,870.  Specification of Letters Patent.  Patented Mar. 12, 1918.

Application filed April 30, 1917. Serial No. 165,342.

*To all whom it may concern:*

Be it known that I, LIONEL A. CARTER, a subject of Great Britain, and a resident of the city of St. Louis and State of Missouri, have invented a new and useful Improvement in Tail-Stocks for Lathes, of which the following is a specification.

This invention relates to the clamping means for locking the spindle in adjusted position in the tail-stock.

The objects of the invention are to provide for clamping the spindle rigidly by means operated by a turn of the wrist and which can be readily clamped and unclamped with one hand; further, to reduce the wear on the spindle from the clamping means and to compensate the wear of the clamping member; and to eliminate wear on the portions of the spindle and spindle guide which hold the spindle in alinement in clamped position.

Further objects appear in connection with the following description of a preferred form of the invention, reference being had to the accompanying drawings. What the invention consists in is stated in the appended claims.

Figure 1:
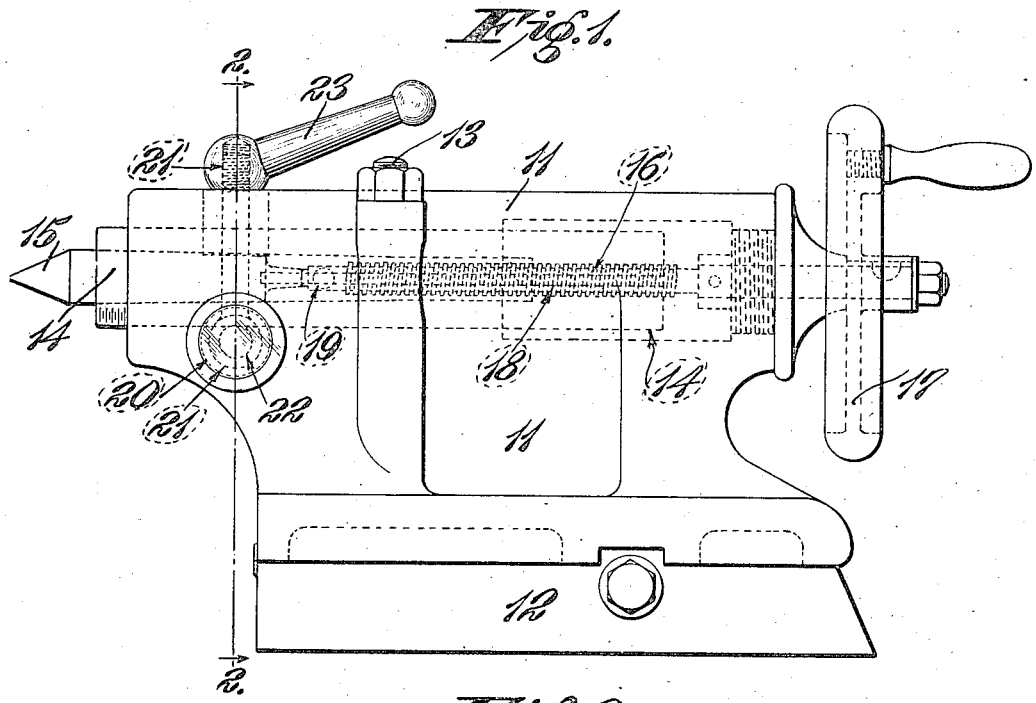
Figure 2:
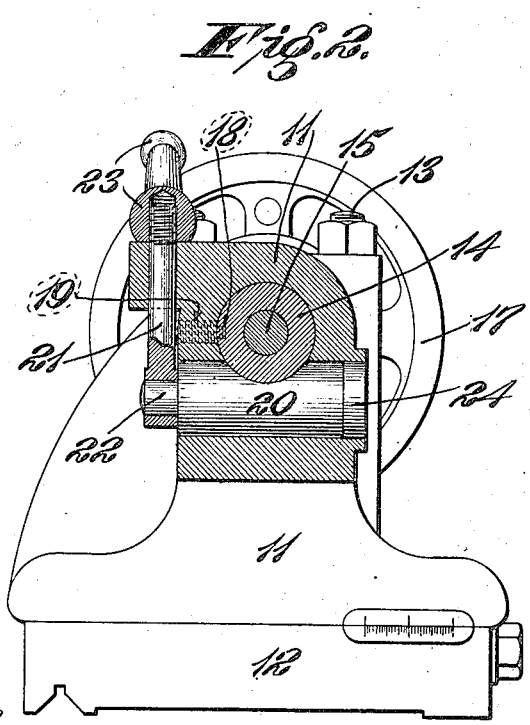

In the drawings, wherein the same reference characters designate the same parts in both views, Figure 1 is a side elevation of a tail-stock embodying the invention; and Fig. 2 is a cross-section of the same on the line 2—2 in Fig. 1, looking in the direction of the arrows.

The drawings illustrate the invention applied to a tail-stock of well known type, consisting of a stock 11 mounted on a base plate 12 for cross adjustment, and provided with bolts 13 for bolting it down upon the bed of a lathe. The spindle 14 is cylindrical, and is mounted for longitudinal movement in a cylindrical bore in the stock. The spindle carries a center 15 at its outer end, and is adjusted in and out of the stock by means of a screw 16 and hand-wheel 17 which are rotatably mounted in the stock and held from lengthwise movement by suitable means. The spindle has a groove 18 along one side within which fits the inner squared end of a set screw 19 to hold the spindle from rotating in the stock.

The spindle is clamped in adjusted position by means of a clamping shaft 20 which is loosely arranged crosswise beneath the spindle and which has a groove across its top side conforming to the under side of the spindle. The clamp shaft can be lifted up to bear against the spindle and bind it against the top of the bore of the stock by means of an eye-bolt 21 which is pivoted on a projecting stud 22 on one end of the clamping shaft. The upper end of the eye-bolt passes through an ear on the stock and is screw-threaded to take an operating handle 23. By turning the operating handle, the eye-bolt is raised or lowered to lift up or release the clamping shaft. The end 24 of the clamping shaft remote from the stud 22 is slightly larger than the remainder, and substantially fills the hole in the stock.

From the foregoing description, it is evident that no metal parts have to be distorted in order to clamp the spindle, and that the ordinary wear of the parts does not affect the true alinement of the spindle. The weight of the spindle causes some friction and wear on the clamping shaft, and on the under side of the spindle, but wear on the clamping shaft is not detrimental to the accurate alinement of the spindle in its bore, because it is compensated for by turning the clamping handle to clamp the spindle. Slight wear on the under side of the spindle is not detrimental, because accurate alinement is only required when the spindle is clamped. Clamping the spindle causes it to bear against the top of the bore, which is not subject to wear and which retains its shape and accurate alinement.

The clamping handle operates easily both for clamping and releasing the spindle, as it has no split sleeves to contract or sliding wedges or other parts to operate. The invention is not restricted to the shape and arrangement of parts shown in the drawings.

I claim the following as my invention:

1. A tail-stock for lathes and the like, said tail-stock comprising a spindle slidably mounted in a longitudinal bore therein, a clamping bar arranged crosswise below said spindle, said bar being loosely held at one end and arranged for crosswise movement with respect to the spindle, and means connected to its opposite free end for raising said clamping bar to clamp said spindle in said bore.

2. A tail-stock for lathes and the like, said tail-stock comprising a spindle slidably mounted in a longitudinal bore therein, a clamping member arranged crosswise below said spindle, and means for raising said clamping member to clamp said spindle in said bore comprising a link connected to one end of said clamping member, said link projecting up through said stock and provided with a screw upon its upper end, and a hand operated nut on said screw, the lower face of the nut bearing on said stock when screwed down to raise said link.

3. A clamping device for a spindle arranged in bore having solid walls, said clamping device comprising a clamping bar arranged crosswise of said spindle and having one side shaped to conform to the side of the spindle, said clamping bar being loosely held at one end and having a connecting member secured to its other end, and means for operating said connecting member to move said clamping bar toward said spindle.

4. A tail-stock for lathes and the like having a spindle arranged for longitudinal movement, a cross-shaft arranged below said spindle and mounted to swing up and down at one end to engage against the under side of said spindle, the under side of said cross-shaft being notched to receive said spindle, and said cross-shaft having endwise movement to permit it to float with said spindle, said end of said cross-shaft having an eye-connection with a rod for adjusting it vertically, and means on said rod accessible to the operator for clamping it in raised position.

Signed at St. Louis, Missouri, this 27th day of April, 1917.

LIONEL A. CARTER.

Copies of this patent may be obtained for five cents each, by addressing the "Commissioner of Patents, Washington, D. C."